Aug. 4, 1970  F. TOTH  3,522,703
MULTISTAGE TANGENTIAL TURBINE
Filed Jan. 2, 1968  6 Sheets-Sheet 1

INVENTOR.
FERENC TOTH
BY
Bair, Freeman & Molinare
Attys.

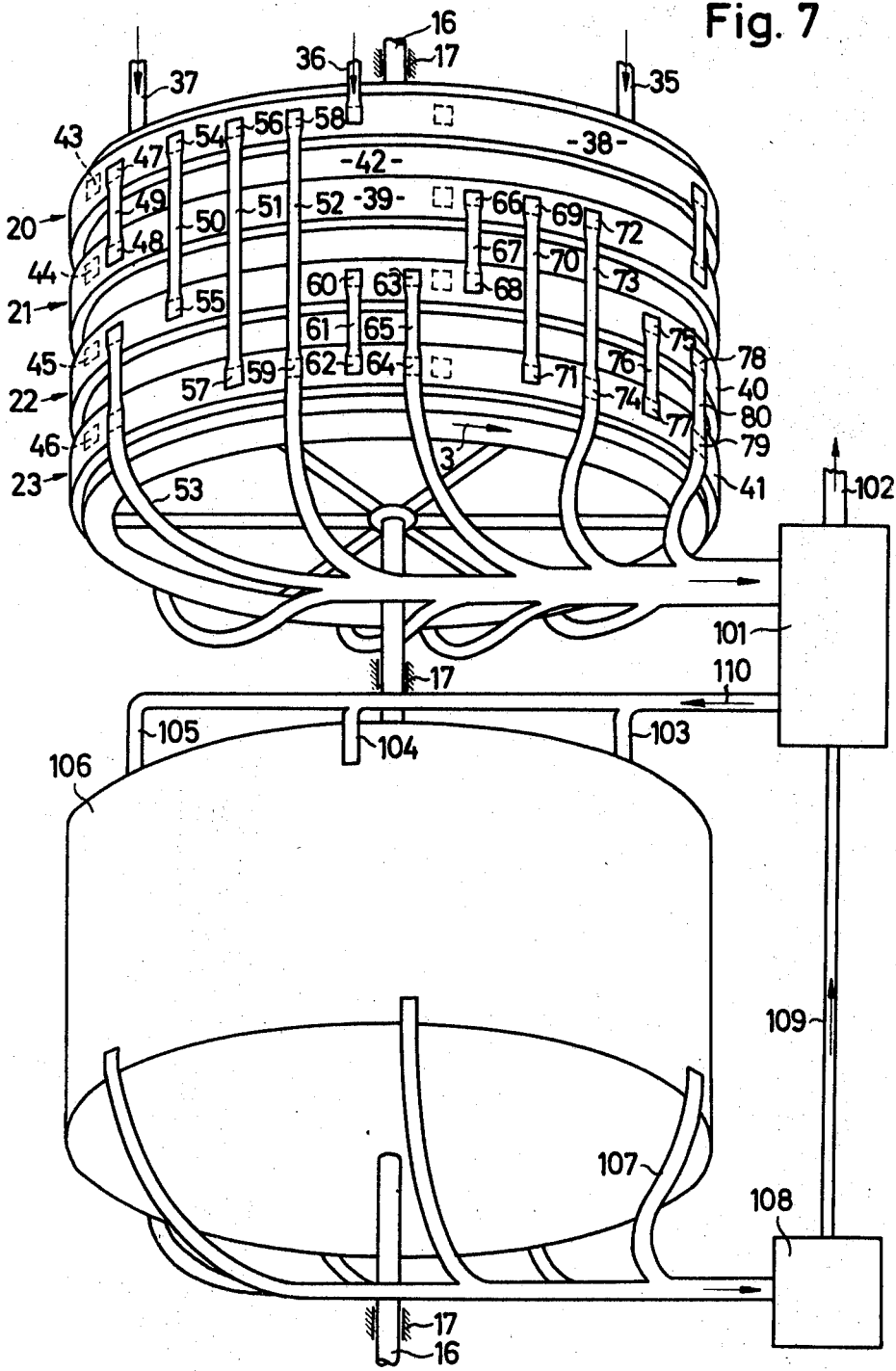

United States Patent Office 3,522,703
Patented Aug. 4, 1970

3,522,703
MULTISTAGE TANGENTIAL TURBINE
Ferenc Toth, Bonifatiusplatz 16, Hannover, Germany
Filed Jan. 2, 1968, Ser. No. 695,061
Int. Cl. F02c *3/04, 7/02;* F01d *1/16*
U.S. Cl. 60—39.18                     5 Claims

ABSTRACT OF THE DISCLOSURE

A small-sized multistage gas turbine having a relatively low peripheral speed and high efficiency, in which the rotor is surrounded by a stator having a series of tangential conduits therethrough. A tangentially-disposed combustion chamber is provided in the surface of the rotor, which chamber communicates with the stator conduits in succession as the rotor turns. The first conduit in said series supplies fuel gas to the combustion chamber and the additional conduits serve as exhaust ports through which gases escape step-wise from the chamber as the chamber travels past the outlets. The inflowing gas expands upon combustion and imparts a thrust to the rotor. As the chamber moves into communication with the exhaust conduits, the gas again flows partly out of the chamber, to produce a recoil in the chamber, effective in the direction of rotation. The exhaust conduits connect to the next following turbine stage where the same effect is exerted as in the initial turbine stage. The expansion in defined stages, resulting from intermittent gas flow to the rotor, produces much slower peripheral velocities than where all the kinetic energy is supplied at once.

---

This invention relates to a multistage tanagential turbine having a rotor and a stator and intended in particular for the driving of motor vehicles and the like.

In particular, in recent times, many attempts have been made to construct small gas turbines which are suitable for motor vehicles. Larger gas turbines have in recent decades proved themselves to be capable of competing with conventional engines when used for the propulsion of ships, locomotives and aircraft. However, it has not yet proved possible to do this with small turbines.

In order to achieve a high degree of efficiency with turbines, the peripheral velocity of the rotor must increase in proportion with the flow velocity of a gas. In this connection, the flow velocity of the gas is generally as high as possible, in order that the gas may, despite its small mass, be able to carry a considerable amount of energy. This makes a correspondingly high peripheral velocity necessary, but, in the case of the larger gas turbines, due to the large rotor diameter, the speeds attained in this way are not very high. Since a small gas turbine is required to operate with the same pressure ratio as a large machine if its efficiency is to be satisfactory, it is necessary to operate with the same peripheral velocity in small gas turbines as in large gas turbines. This peripheral velocity is, however, achieved in the case of small turbines having a diameter of, for example, 25–30 cm., only by means of an extremely high speed of, for example, 50,000 r.p.m. This high speed is, however, extremely disadvantageous for various reasons. This would appear to be the main reason for the fact that hitherto small gas turbines have not been able to compete with conventional engines.

With the aid of the invention, this difficulty is to be obviated and a novel tangential turbine is to be provided wherein the gas is able, without any diminution in the efficiency, to flow much more slowly than the hitherto known gas turbines, i.e. wherein an extremely low speed (for example, 10,000 r.p.m. with a diameter of 30 cm.) is necessary.

For the solution of this problem, there is proposed a tangential turbine consisting of a plurality of turbine stages arranged one behind the other and having a stator and a rotor, characterized in that in each turbine stage the stator and the rotor are disposed opposite each other, in fluid-tight manner on an annular face and there is provided in the rotor at least one chamber which opens out into an aperture located within the zone of the sealing annular face and extends towards the rear, substantially tangentially relatively to the rotary movement of the rotor, there being disposed in the stator walls, in the path of the aperture, conduit connections which are arranged one behind the other and the first of which, in the direction of rotation of the rotor, serves as an inlet for charging the chamber in the rotor when the aperture associated therewith travels past it, whereas the next-following conduit connections serve as outlets which permit the gas to escape step-wise out of the chamber when the aperture in the chamber travels past the said outlets. With this arrangement, preferably a multiplicity of such turbine stages is arranged side by side and in disc-like manner on a shaft and at least the first (in the direction of rotation) of the outlets of the front turbine stages are connected with the inlets of subsequent turbine stages.

In the case of the tangential turbine according to the invention, there is first of all achieved, in the foremost turbine stage, a first propulsion in the direction of rotation by the gas flowing substantially in the tangential direction into the chamber. With the rotor rotating, after the charging or filling of the chamber, the aperture is closed when it has moved away from the inlet. If, then, the aperture passes into coincidence with the next-following outlet, then the gas once again flows partly out of the chamber, thus producing in the chamber a recoil which is again effective in the direction of rotation. The outflowing gas passes, via a connecting conduit and an inlet of the next-following turbine stage, into the chamber thereof where it exerts the same effect as in the foremost turbine stage, i.e. produces a propulsion effect. The pressure drop of the gas during this procedure is substantially determined by the volume of the conduit connecting the outlet and inlet and of the two chambers in the turbine stages. Thus, during this period of coincidence, there is a relatively accurately defined part-expansion of the gas, in such manner that there still remains gas under pressure in the chamber of the foremost turbine stage.

In the same way, also the remaining outlets of the foremost turbine stage may be connected with the inlets of subsequent turbine stages; it is very necessary to always pay attention to the fact that, when the various apertures are made to coincide there is always available a pressure fall which results in the outflow of the gas from the first chamber and the inflow of gas into the second chamber.

This expansion of the gas, taking place in defined stages, is an important reason for the fact that the turbine according to the invention is able to operate at relatively low peripheral velocity. The fact that the kinetic energy of the flowing gas is fed only intermittently to the rotor results in much smaller flow velocities than would be produced if the entire kinetic energy were to be supplied at once. The peripheral velocity of the rotor is also correspondingly smaller.

Calculation shows that, for example, a gas flowing, without intermittent expansion, out of the chamber in which at-rest conditions obtain, at a velocity of 1,700 m./sec., would, due to the step-wise expansion out of the chamber in which at-rest conditions obtain flow out only at a velocity of 750–1,000 m./sec. This velocity diminution is additionally affected by the fact that when the gas flows into a cavity a part of the gas remaining behind in the said cavity is included in the flow, so that, practically speaking, the mass of the flowing gas is increased.

In practice, the position is still more advantageous, The gas does not flow out of a chamber in which at-rest conditions obtain but out of a chamber moving with a peripheral velocity $C_u$. If, therefore, C is the flow velocity when the chamber is at rest, then the outflow velocity of the gas out of a chamber moving at a velocity $C_u$ is only equal to $C-C_u$.

A further important reason for the diminished peripheral velocity of the rotor resides in the fact that, in the case of the turbine according to the invention, a part of the kinetic energy of the gas flowing out of a chamber is used for the compression of the gas remaining behind in the sequentially connected chamber. This energy is released in order to work, only during the subsequent expansion of the sequentially connected chamber, i.e. until then it is stored. In the conventional, multi-stage turbines, the efficiency is highest if the entire kinetic energy of the flowing gas is converted to useful work in every stage. A complete energy conversion without energy storage can be achieved if $C_u$ is equal to 0.5 C. Since, however—in contradistinction to what obtains with conventional turbines—a part of the energy (assumed to be 25%) is stored, the residual part of 75% of the energy may already be converted at $C_u=0.25$ C. The step-wise expansion of the gas (i.e. the energy grading) is not influenced by the speed of the rotor, but depends only on the volume of the chambers and connecting conduits. This has the further advantage that the gas throughput of the turbine according to the invention, pre-supposing constant inlet pressure, is directly proportional to the speed (and also the size and number of chambers per turbine stage). In the case of conventional turbines, on the contrary, the energy grading depends very considerably on the speed, so that in that case a speed which is to be as constant as possible must be achieved. Furthermore, in that case a part of the driving medium may, to a certain degree independently of the speed, escape past the blades.

The charging of the cavity with gas may be effected quite simply by connection to a pressure gas conduit. The pressure gas may be produced for example by burning an air-fuel mixture. It is, however, also possible to charge the cavity with an air-fuel mixture (fuel gas) and to produce the necessary pressures by causing the fuel gas to ignite in the cavity.

The path from the inlet to the first outlet in the direction of rotation may be so dimensioned that combustion has just been terminated when the gas begins to flow out of the first outlet. It may, however, also be expedient to open the first outlet when only a fraction of the mixture has been burnt, since in this way it becomes possible to exploit the pressure difference building up along the chamber during the combustion process, before the pressure in the chamber has been equalized. With this solution, therefore, the gas does work even during the combustion process. The residual, still unburnt mixture, flows into the connecting conduit, to the next turbine stage, and burns there so that a further driving surge is generated partly in the first stage and partly in the sequentially-connected stage. The first outlet may, for this purpose, be long in design and opens for as long as is necessary to burn the mixture in the connecting conduit. This is, however, not absolutely necessary.

The waste gas energy is relatively large. It may also be partially exploited by heating the sucked-in, compressed fresh air by the waste gas in a heat exchanger.

However, in order to exploit the waste gas energy to a still greater extent, under a greater load, it may also be expedient to heat a steam generator with the waste gas and to connect with the last (in the direction of rotation) outlets of the turbine stages a steam generator which generates steam, by using the waste gas heat of the turbine stages, there being also arranged on the same shaft with the turbine stages a second group of similarly designed turbine stages which are fed with the steam from the steam generator. With this arrangement it is expedient to convey the steam for the second group of turbine stages, in a closed circuit and via a condenser, back to the steam generator.

The invention is to be discussed in greater detail with reference to the drawings, wherein:

FIG. 7 shows an entire installation, corresponding to FIG. 3, having a supplementary turbine installation for utilizing the waste gas energy.

Figure 1:
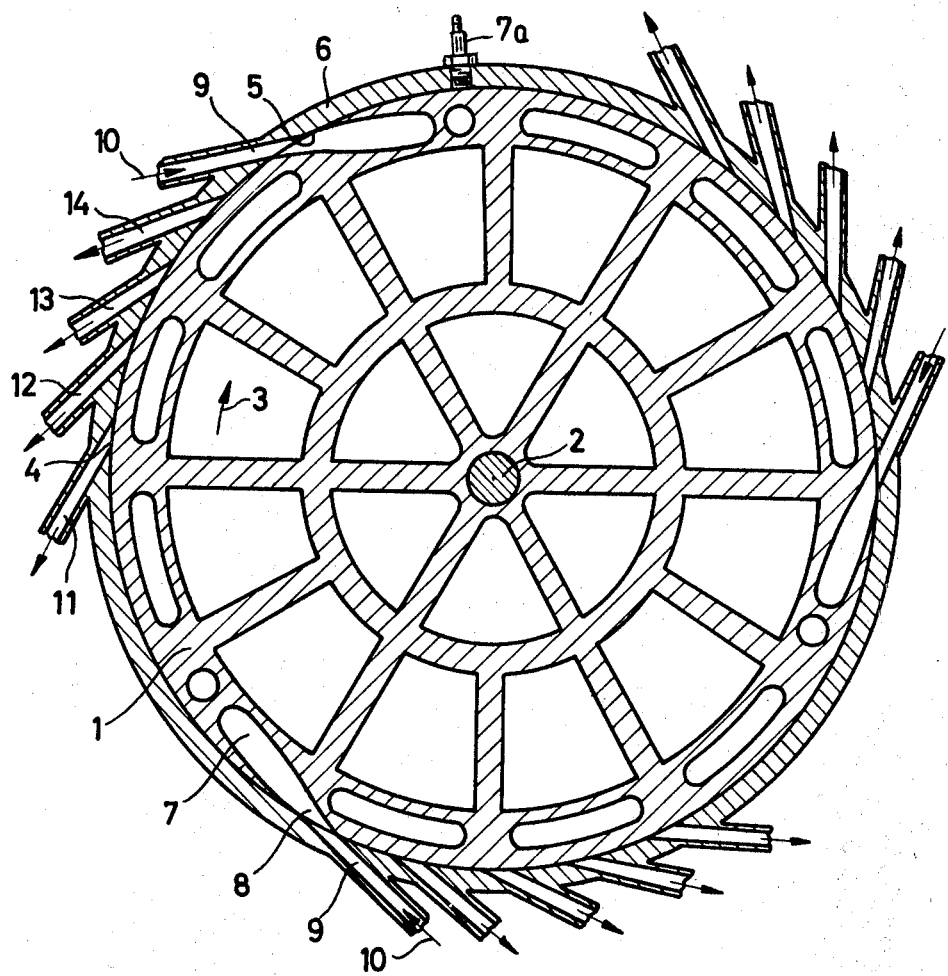
FIG. 1 illustrates the principle of the invention in a cross-sectional drawing of a first embodiment of a turbine stage.

In the case of a turbine stage illustrated in FIG. 1, a rotor 1 is rotatably mounted on a shaft 2, the direction of rotation being indicated by the arrow 3. The rotor 1 has a cylindrical outer face 4 and is so fitted in a stator 6 that the rotor outer face 4 is, at the outermost surface, positioned directly opposite the corresponding cylindrical inner face 5 of the stator 6, there being left between these two faces only a small expansion gap such as is just sufficient (taking into consideration the varying heat expansion of the rotor and the stator) to ensure that the rotor shall be freely rotatable. The sealing of this expansion gap is effected in the manner well-known in the turbine art.

Arranged in the rotor 1 is a multiplicity (three in the example shown) of chambers 7 having an aperture 8 extending substantially tangentially in the direction of rotation, towards the rear. In the rotation position of the rotor 1 shown in FIG. 1, the said apertures 8 are in every case positioned opposite stator-side inlets 9 having substantially the same direction as the apertures 8. The inflowing gas is symbolized by an arrow 10. Furthermore, there is a multiplicity of outlets 11, 12, 13 and 14 behind each inlet 9, in the direction of rotation.

If pressure gas is introduced in the inlets 9, then this gas impinges substantially in the tangential direction against the walls of a chamber 7, so that in this way a rotary pulse in the direction or rotation is exerted on the rotor 1. After a pre-determined angle of rotation, each aperture 8 coincides with the next-following outlet 11 in the direction of rotation, the chamber 7, which is substantially still subjected to the initial pressure, being connected with a chamber of lesser pressure. Consequently, the gas flows out of the chamber 7 and in this way produces a recoil which again drives the rotor 1 in the direction of rotation. During further rotation. the same outflow procedure takes place also in the case of the other outlets 12, 13 and 14, so that the pressure in the chamber is diminished step-wise and the gas flows out only step-wise.

The charging of the chamber 7 may also be effected with an air-fuel mixture (fuel gas) which is not ignited until it is in the chamber. The ignition may be effected by means of a residue remaining in the chamber from the previous combustion, or it may effected by heater plugs, hot bulbs or spark plugs as at 7a in FIG. 1. During the time that the pressure resulting from the combustion in the chamber 7 increases, the aperture 8 has already moved away from the inlet 9, so that now the aperture 8 is closed by the cylindrical walls of the stator 6. The path from the inlet 9 to the outlet 11 following next in the direction of rotation is, in the example according to FIG. 1, so calculated that the combustion process is completed approximately when the aperture 8 coincides with the outlet 11. At this instant, the burnt gas under high pressure flows into the outlet 11 and in this way produces at the walls of the chamber 7 a recoil which propels the rotor in the direction of rotation. What has been said previously applies also to the outflow procedure.

Figure 2:
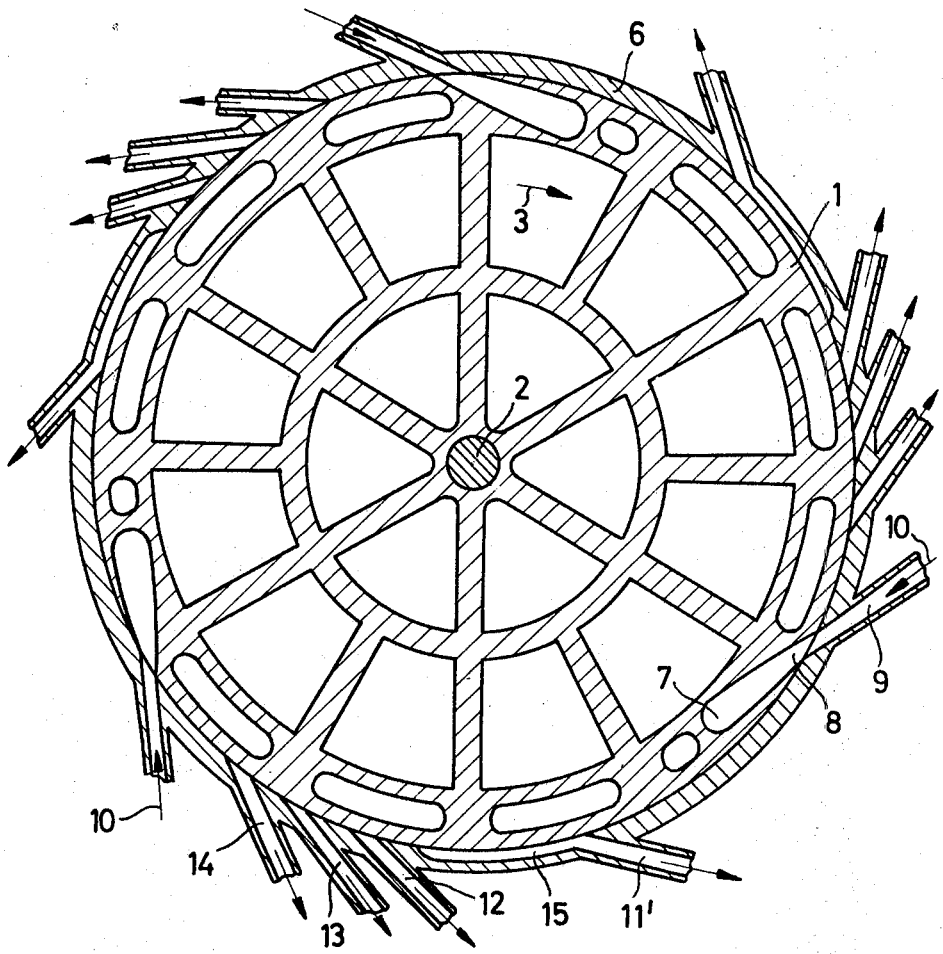
FIG. 2 shows an embodiment of a turbine stage which has been varied relatively to that of FIG. 1.

FIG. 2 illustrates a cross-section through a further example of embodiment of a turbine stage corresponding substantially to that of FIG. 1, but with the difference that the outlet 11' is shifted forwardly relatively to the direction of rotation 3 of the rotor 1, so that the aperture 8 already coincides with the outlet 11' at a relatively early stage. According to a supplementary provision, there may also be connected to the outlet 11' (in the direction of rotation) a more or less long recess 15 putting the aperture 8, for a larger angle of rotation, into connection with the outlet 11. The embodiment of FIG. 2 is designed to exploit the impact or surge energy produced during the combustion procedure, i.e. to cause the combustion gas to do work even during the combustion process.

In so doing, use is made of the fact that the combustion gas contained in the chamber 7 builds up its pressure starting from the chamber zone remote from the aperture 7 and therefore, during the combustion process, there is available along the chamber a pressure difference which, on reaching the outlet 11' is exploited for the purpose of doing work in the driving direction. This work done is supplementary, since in the example of FIG. 3, when the outlet 11 is reached, no such pressure difference still obtains in the chamber 11. The gas emerging, with this work output, out of the outlet 11' is still unburnt. It burns in the outlet duct and in this way exerts, on the one hand, a further pressure, which is effective in the driving direction, on the chamber 7 and, on the other hand, also a pressure (also effective in the driving direction) on the turbine stage sequentially connected after the outlet 11', doing so in the manner described hereinbelow. The length of the recess 15 is so calculated that the gas in the outlet duct has been substantially burned when the aperture 8 leaves the outlet 11' or the recess 15.

Figure 3:
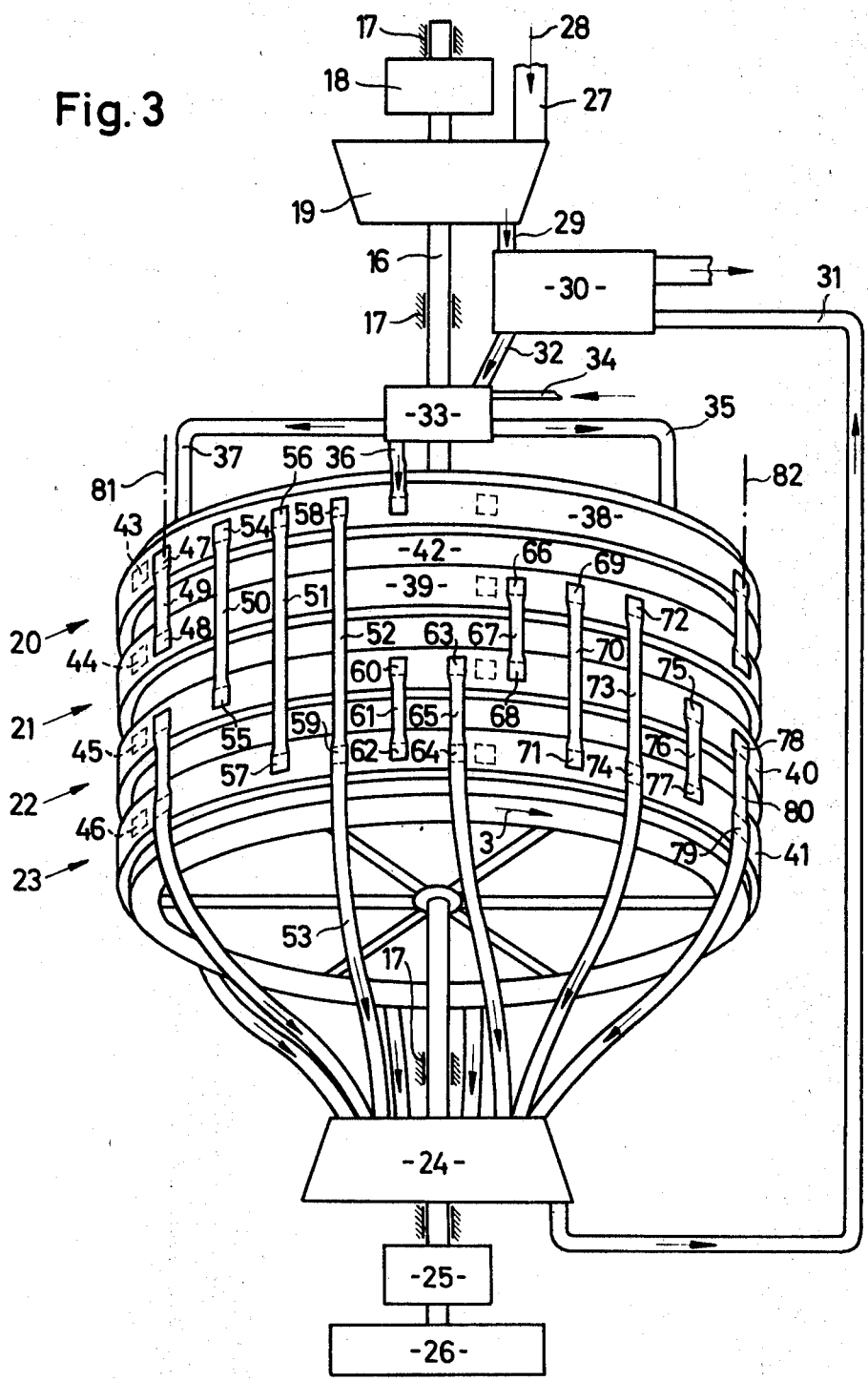
FIG. 3 shows an example of an entire installation having a turbine according to the invention.
Figure 4:
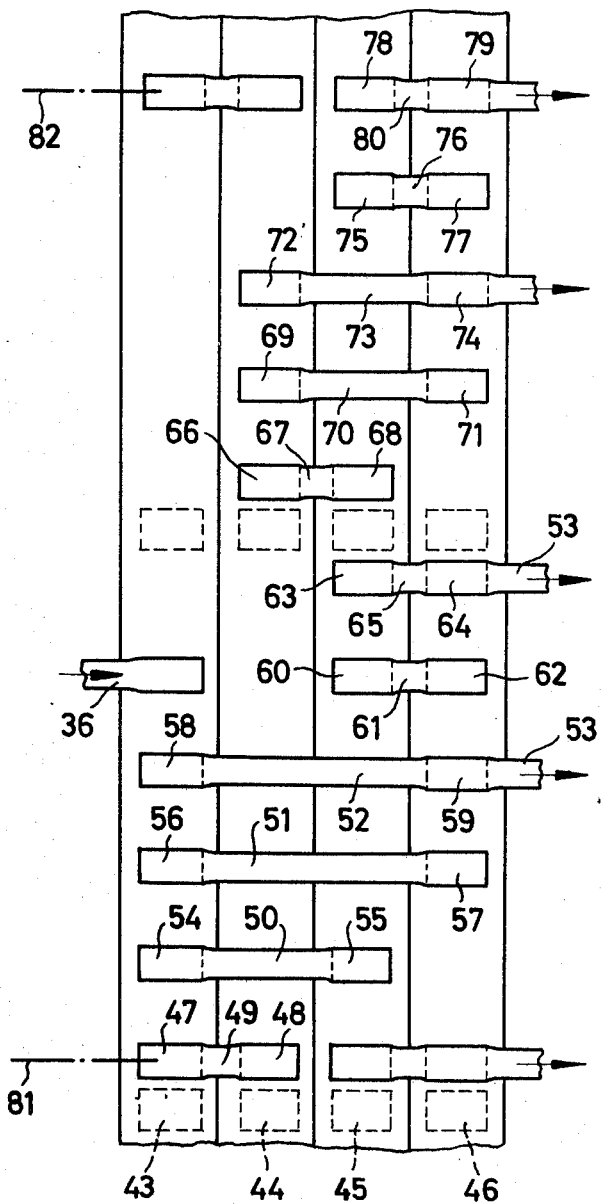
FIG. 4 shows, diagrammatically, a development of the plan view of the turbine according to FIG. 3.

For the construction of a complete turbine set the outlets 11, 12, 13 and 14 shown in FIGS. 1 and 2 are connected with the inlets of further turbines which are designed substantially in the same manner as those according to FIGS. 1 and 2 and are mounted together therewith on a shaft. A form of embodiment of this kind and the mode of connecting the outlets with the inlets is illustrated in FIG. 3 wherein an entire installation using the above-described turbine stages is diagrammatically illustrated. FIG. 4 shows still more clearly the manner of connecting the outlets and inlets.

Arranged on a shaft 16, mounted on bearings 17, are a starting motor 18, a compressor 19 and a turbine set formed from four tangential turbine stages 20, 21, 22 and 23. Simultaneously, there acts upon the shaft 16 also a turbine 24 which may optionally have a higher speed (for example, up to twice the speed) than the turbine set 20–23. The said turbine 24 is, for purposes of simplication, shown as being fitted also on the shaft 16. In this case, it plays only a subsidiary part; the energy conversion takes place for much the greater part in the tangential turbines 20–23. If turbine 24 is entirely dispensed with, the total efficiency, at, for example, 200 m./sec. peripheral velocity, is only 7–8% less. Thus, the turbine 24 may be extremely simple, it may for example be a radial turbine which is combined with a compressor and is able to rotate with the latter on a shaft.

The shaft 16 drives a load 26 via a transmission system 25. Suction air for the installation flows through a suction pipe 27, in the direction of an arrow 28, into the compressor 19 and from there, via a pipe 29, into a heat exchanger 30, which is described in greater detail later and to which hot waste gases are fed via a pipe 31, thus heating the compressed suction air. The heated suction air flows, via a pipe 32 into a carburetor 33 to which petrol is fed via a pipe 34 and in which there is formed an air-petrol mixture which is fed via inlet conduits 35, 36 and 37 to the first turbine stage 20.

The inlet conduits 35, 36 and 37 correspond to the three inlets 9 of FIGS. 1 and 2. They are secured to an annular stator 38 of the turbine stage 20. The turbine stage 21 has an annular stator 39, the turbine stage 22, an annular stator 40 and the turbine stage 23 and annular stator 41. In practice, all the stators are expediently one piece. Within the stator rings 38 to 41 travels a rotor 42 which is common to all the turbine stages and in which the corresponding chambers are provided. The rotor rotates clockwise, as seen from below.

The broken lines indicate rotor-side apertures 43, 44, 45 and 46 corresponding to the apertures 8 in FIG. 1. The stator-side inlets and outlets are so connected together via connecting conduits that the fuel gas expands step-wise from turbine stage to turbine stage and does corresponding work in every stage. This is clear, in detail from the following discussion of the anode of operation of the machine according to FIG. 3.

For starting up the machine, the starting motor 18 is switched on and in this way the shaft 16 is put in rotation. This causes the compressor 19 to become operative and to press air into the carburetor 33 where it is mixed with petrol, thus producing a combustible air-petrol mixture.

As soon as for example the aperture 43 of the first turbine stage (shown on the left-hand upper side in FIG. 5) coincides with the inlet connected to the inlet conduit 37, the chamber, arranged in the rotor 42 and connected to the aperture 43 of the first turbine stage 20 is filled with the air-petrol mixture. When the aperture 43 has left the inlet, then (for example, by means of a spark plug—not shown) the air petrol mixture is ignited, so that the mixture burns and finally on reaching the first outlet 47 (corresponding to the outlet 11 or 11' in FIGS. 1 and 2) burnt, hot gas under high pressure is present in the cavity. When the aperture 43 coincides with the outlet 47, the hot gas flows partly through a connecting conduit 49, an inlet 48 and the aperture 44 into the corresponding chambers of the second turbine stage 21 until substantial pressure equilibrium obtains in the connected chamber system. By means of the gas flowing out of the aperture 43 into the connecting conduit 49, there is produced in the chamber associated with the aperture 43 a recoil effect which propels the rotor. Simultaneously, the gas flowing into the chamber associated with the aperture 44 produces a thrust effect and therewith also a propulsion in the direction of rotation. The recoil and the thrust are limited, since also the expansion of the gas in the chamber system available is limited. Thus the energy of the gas is, at this instant, only partially exploited.

Further partial exploitation of the gas energy takes place in a subsequent stage when, during further rotation of the rotor, the aperture 43 passes into coincidence with the second outlet 54 of the turbine stage 20 (corresponding to the outlet 12 in FIGS. 1 and 2). The gas now flows via a connecting pipe 50 and an inlet 55 into the aperture 45 of the third turbine stage 22, since meanwhile, due to the rotation of the rotor, the aperture 45 of the third turbine stage 22 has passed into coincidence with its inlet 55. During this second expansion stage, the initial pressure in the chamber associated with the aperture 43 is the pressure which has adjusted itself at the conclusion of the first expansion stage. Due to the outflow of the gas out of the chamber associated with the aperture 43, a recoil is again produced and due to the inflow of the gas into the chamber associated with the aperture 45 a thrust is produced. Due to the accurately determined volume of the chamber system, the expansion is again limited, so that in this case also all that takes place is an expansion step.

A further expansion step (although at correspondingly lower pressures) takes place when the apertures 43 and 46 are caused to coincide via a connecting pipe 51 with the third outlet 56 of the turbine stage 20 of the inlet 57 of the fourth turbine stage 23. The result of this is, once again, a function analogous to that described hereinabove.

In the last stage, the said apertures 43 and 46 are caused to coincide with the outlet 58 and the outlet 59. In this last expansion stage, the pressure is already relatively low, so that no further exploitation in a further tangential turbine stage would be worthwhile. Thus, the waste gas is conveyed via a connecting conduit 52 and a pipe 53 into the turbine 54, in which a last energy exploitation takes place.

If the apertures 43 and 46 of the first and last stages coincide with the outlets 58 and 59 then the chambers associated with the apertures 44 and 45 in the second or third turbine stage are still closed and filled with pressure gas which may again be exploited. This further exploitation is effected for the aperture 45 (third turbine stage 22) when coincidence is established with an inlet 60. The gas then flows via a connecting pipe 61 into an inlet 62 and then through the aperture 46 into the associated chamber of the first turbine stage 23. During this procedure, a recoil and a thrust effect take place in the same manner as before. During further rotation the apertures 45 and 46 pass into connection with the outlets 63 and 64 out of which the expanded gas flows, via a connecting pipe 65 and a corresponding pipe 53, once more into the turbine 24.

The utilization of the gas in the chamber associated with the aperture 44 (second turbine stage 21) is effected via the outlet 66, the connecting pipe 67 and the inlet 68, in combination with the chamber associated with the aperture 45 of the third turbine stage which has meanwhile moved on correspondingly, having previously been emptied through the outlet 63. Further expansion takes place via the outlet 69, the connecting pipe 70 and the inlet 71 to the fourth turbine stage, and finally via the outlet 72, the connecting pipe 73 and the outlet 74 to the turbine 24.

The gas which has flowed in through the inlet 68 into the chamber, associated with the aperture 45, of the third turbine stage is once again utilized by the outlet 75, the connecting pipe 76 and the inlet 77, in combination with the chamber associated with the aperture 46 of the fourth turbine stage. In the last stage, a connection to the turbine 24 is again established by means of outlets 78 and 79 and also a connecting conduit 80.

FIG. 4 shows especially clearly the mode of connecting the outlets and inlets. The same reference numerals as in FIG. 3 have been employed. The working cycle extends from a line 81 to a line 82. With three groups of inlets and outlets (corresponding to what is illustrated in FIGS. 1 and 2) this working cycle is completed, in each chamber, three times per complete rotation of the rotor, the two last cycles being identical with the previously discussed first cycle. However, it is also possible to provide more or less than three cycles per rotation. In all cases, the outlets in which the pressure is too low to make further exploitation by the subsequent turbines worthwhile, are connected via conduits 53 to the turbine 24 in which the last exploitation of the energy takes place.

Figure 6:
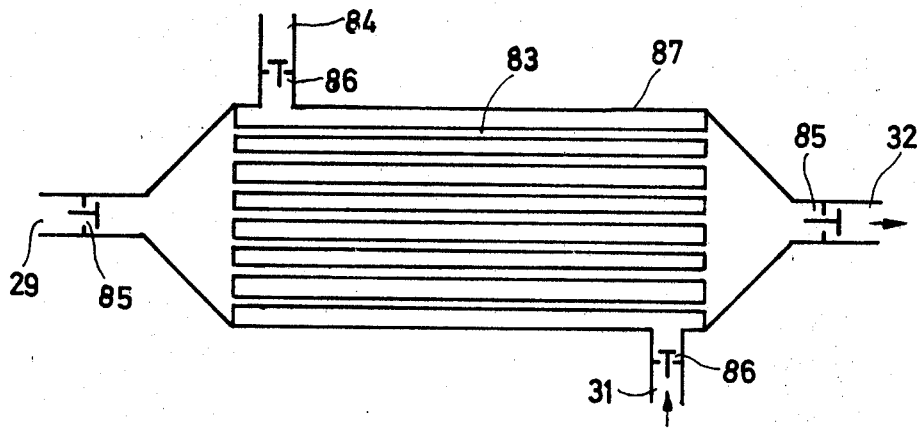
FIG. 6 shows an example of embodiment of a heat exchanger contained in the plant according to FIG. 3.

FIG. 6 shows an especially advantageous example of embodiment of the heat exchanger 30 provided in the machine according to FIG. 3. What is concerned is a special counter-flow tubular exchanger having a tube system 83 arranged in a container 87. The sucked-in and compressed fresh air out of the pipe 29 flows, internally through the tube system 83 and leaves the heat exchanger via the pipe 32. The waste gas flows out of the pipe 31 into the container 87, flows about the tube system 83, on the outside thereof and flows out once again via the outlet 84. In each of the connections of the pipes 29, 31 and 32 and also in the outlet 84 is a nonreturn valve 85 or 86. The valves 85 prevent the flowing-back of the fresh air which, with increasing heating, attains increased pressure, and the valves 86 correspondingly prevent the flow back of the waste gas which, with increasing cooling, loses pressure.

Expediently, a multiplicity of the heat exchangers illustrated in FIG. 6 is connected one after the other to constitute an exchanger group. Since the individual heat exchangers heat the sucked-in fresh air at practically constant volume, it becomes possible in this way to provide on the one hand the necessary heat exchanger and on the other hand increasing pressures in the successive tube systems.

In order to calculate the efficiency of the tangential turbine according to the invention, it has been assumed that there is an air compression of 1:4, that the system is fully loaded, that the compressed air has been heated in the heat exchanger 30 at constant volume from the compression temperature (170° C.) to approximately 500° C., that the volumes of the chamber 7 in the first to third stages 20–22 and of the associated connecting conduits amount to approximately 14.30 cm.³ and of the chamber 7 in the fourth stage 23 to approximately 28.60 cm.³, that all the four stages each have three chambers, and that the end-stage turbine 24 rotates at double the speed of the turbine set 20–23.

Figure 5:
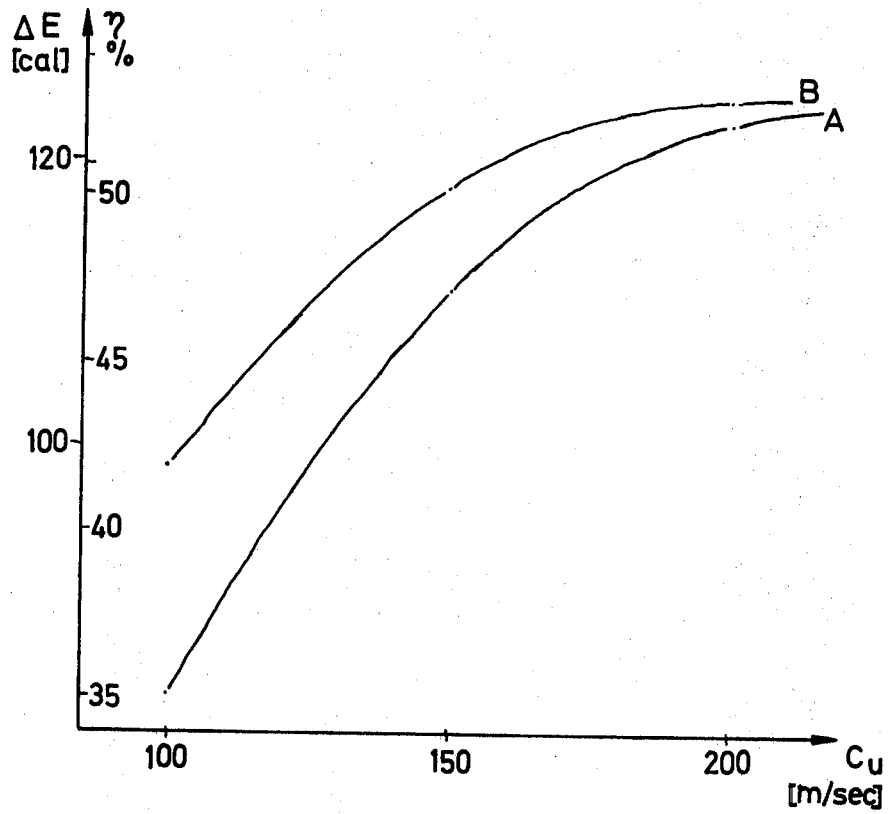
FIG. 5 shows a diagram illustrating the efficiency of turbines according to the invention.

The results of the calculations are shown in diagrams in FIG. 5 of the drawings, wherein in every case the degree of efficiency $\eta$ or the exploited heat $\Delta E$ has been plotted in dependency on the peripheral velocity $C_u$ of the rotor. The curve A relates to the case wherein the entire mixture is completely burnt in the first chamber (FIG. 1), the curve B to the case wherein only the first half of the mixture is burnt in the first chamber, whereas the second half is burnt in the first connecting conduit (FIG. 2). In the calculations, the friction and eddy losses (which may amount to approximately 12%) have been ignored.

In the example according to FIG. 3, the waste gas energy is made use of in the form of heat, inasmuch as the compressed fresh air is heated in the heat exchangers 30. In this way, however, it is not possible to completely use the waste gas energy this being due inter alia to the fact that the fresh air must not be heated up to the waste gas temperature. A possible mode of further exploiting the waste gas energy is shown in FIG. 7.

As can be seen in FIG. 7, the turbine as already discussed with reference to FIG. 3 is provided, the supplementary turbine 24 no longer being shown in the drawing. The waste gas flowing out of the conduits 53 flows, instead into a steam generator 101 where it gives up its heat in order to generate superheated steam. The said steam generator is so designed that it does not constitute any substantial flow resistance for the waste gas, so that the waste gas flowing out of the last turbine stage 23 of the multistage tangential turbine is able to expand practically to atmospheric pressure. The efficiency of this last turbine stage 23 is not detrimentally influenced thereby, but the waste gas is able to give off its energy in the form of heat. It escapes via a pipe 102.

The steam generated in the steam generator 101 flows via inlet conduits 103, 104 and 105 into a second multistage tangential turbine 106 (supplementary turbine) built up in exactly the same way as the multistage tangential turbine disposed above it (the main turbine). The inlet conduits 103, 104 and 105 thus correspond to the inlet conduits 35, 36 and 37. In the said supplementary turbine 106, the steam flowing in under high pressure is exploited in practically speaking the same manner as in the main turbine. The expanded steam finally flows away, as saturated steam, through pipes 107 and into a condenser 108 out of which the water formed passes, via a pipe 109, back into the steam generator 101. This part of the plant is shown, to a considerable extent, diagrammatically.

The steam flowing out of the steam generator 101 (indicated by an arrow 110) is not able to flow in any desired quantity via the inlet pipes 103, 104 and 105 into the tangential turbine 106, but only in a quantity determined by the size of the chamber 7 in FIG. 1 or 2 and by the speed. Since the speed is prescribed by the main turbine, it therefore becomes possible, by appropriate dimensioning of the size of the chamber 7, to so adapt the steam pressure and steam throughput to the steam generation in the heat exchanger 101, by means of the heat emission of the waste gases, that a maximum degree of efficiency is achieved. Of course, it is also possible to arrange more than three chambers per stage on the periphery of the rotor of the supplementary turbine and in this way also adaption to steam pressure and steam throughout is possible.

What I claim is:

1. A tangential flow turbine comprising, in combination, a plurality of successive turbine stages arranged on a single shaft and operable by means of an expansible fluid, each stage including an annular stator having a stator surface and a cylindrical rotor having an outer rotor surface, said surfaces being in substantially continuous, fluid tight, face-to-face relation, said rotor of each stage mounted for rotation on said shaft, said rotor of each stage having at least one chamber with a passage through said rotor surface positioned for communication with an opening in said stator surface, said passage being substantially tangent to said rotor surface and extending through said surface in a direction counter to the direction of rotor rotation, there being provided in each stage of said stator a series of said openings which lie in the path of said passage from the chamber of the corresponding rotor, each of said openings adapted to come into communication with said passage during rotation of said rotor, the first opening in said series serving as an inlet for charging the chamber in the rotor with expansible fluid when the rotor passage travels past it, and the following stator openings in the series serving as outlets allowing the fluid to escape intermittently out of the rotor chamber when the rotor passage travels past said outlets, each said series of openings of each stage having its inlet followed by $(n+1)$ outlets, where $n$ is the number of following turbine stages, the first outlet following the inlet being connected to an inlet of the next following turbine stage, the second outlet being connected to an inlet of the second following stage seriatim for all the stages, the final outlet in the series being connected to a turbine exhaust, and the passages in the rotors of each stage being disposed so that in the case of each outlet that is connected to an inlet of a following stage both the outlet and the inlet come into communication simultaneously with the respective rotor passages of the respective stages.

2. The improved turbine of claim 1 wherein said expansible fluid is a combustible fuel mixture and wherein said chamber includes means for igniting said combustible fuel mixture within said chamber.

3. The turbine of claim 1 in combination with a second tangential flow turbine of similar design wherein said first turbine is driven by a combustible fuel and has exhaust gases which gases are utilized by means of a heat exchanger to provide steam for driving said second turbine.

4. The improved turbine of claim 2 wherein said combustion is completed prior to reaching said next outlet.

5. The improved turbine of claim 2 wherein at least one of said outlets includes an elongated channel in said stator surface extending in a direction opposite rotor rotation such that combustion is incomplete in said chamber upon connection with said outlet having an elongated channel.

References Cited

UNITED STATES PATENTS

| 749,739 | 1/1904 | Lount | 253—66 |
|---|---|---|---|
| 800,684 | 10/1905 | Schneider | 60—39.44 |
| 960,260 | 6/1910 | Boyer | 60—39.44 |
| 1,200,133 | 10/1916 | Reed | 60—39.44 |
| 2,717,491 | 9/1955 | Barr. | |
| 2,786,647 | 3/1957 | Romero. | |

FOREIGN PATENTS

| 692,042 | 7/1930 | France. |
|---|---|---|
| 1,010,935 | 3/1952 | France. |
| 1,164,866 | 5/1958 | France. |
| 1,189,319 | 1/1963 | Germany. |
| 294,831 | 2/1954 | Switzerland. |

OTHER REFERENCES

"The American Inventor," vol. 15, No. 4, p. 101, April 1906.

WENDELL E. BURNS, Primary Examiner

U.S. Cl. X.R.

60—39.16, 39.44; 253—39, 133